United States Patent
R. et al.

(10) Patent No.: US 11,074,322 B1
(45) Date of Patent: Jul. 27, 2021

(54) ADAPTIVE CAPACITY MANAGEMENT FOR NETWORK LICENSING

(71) Applicant: Juniper Networks, Inc., Sunnyvale, CA (US)

(72) Inventors: Narendra Babu R., Bangalore (IN); Sudhir Vitta, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 219 days.

(21) Appl. No.: 15/651,470

(22) Filed: Jul. 17, 2017

(51) Int. Cl.
*G06F 21/10* (2013.01)

(52) U.S. Cl.
CPC .................. *G06F 21/105* (2013.01)

(58) Field of Classification Search
CPC ............ G06Q 2220/10; G06Q 2220/18; G06F 21/10; G06F 21/105
See application file for complete search history.

(56) References Cited

U.S. PATENT DOCUMENTS

| | | | |
|---|---|---|---|
| 5,579,222 A | 11/1996 | Bains et al. | |
| 5,752,041 A * | 5/1998 | Fosdick | G06F 21/105 |
| | | | 705/59 |
| 6,343,280 B2 | 1/2002 | Clark | |
| 6,574,612 B1 | 6/2003 | Baratti et al. | |
| 6,691,165 B1 | 2/2004 | Bruck et al. | |
| 6,842,896 B1 | 1/2005 | Redding et al. | |
| 7,096,469 B1 | 8/2006 | Kubala et al. | |
| 7,137,114 B2 | 11/2006 | Rich et al. | |
| 7,178,057 B1 | 2/2007 | Heideman et al. | |
| 7,231,370 B1 * | 6/2007 | Kapur | G06Q 10/10 |
| | | | 705/59 |
| 7,260,557 B2 | 8/2007 | Chavez | |
| 7,389,510 B2 | 6/2008 | Forrester | |
| 2004/0249763 A1 | 12/2004 | Vardi | |
| 2006/0036894 A1 | 2/2006 | Bauer et al. | |
| 2007/0201415 A1 | 8/2007 | Gopalakrishnan et al. | |
| 2007/0234418 A1 | 10/2007 | Song et al. | |
| 2009/0055835 A1 * | 2/2009 | Zhu | H04W 28/08 |
| | | | 718/105 |

(Continued)

OTHER PUBLICATIONS

Jones, "Licensing: Setting Up the License Server on a Microsoft Cluster", Citrix Publications Department, Citrix Systems, Inc., Oct. 31, 2006, 11 pp.

(Continued)

*Primary Examiner* — Zachary A. Davis
(74) *Attorney, Agent, or Firm* — Shumaker & Sieffert, P.A.

(57) ABSTRACT

In general, the techniques are described for locally and adaptively managing license token requests for a licensed capacity feature without an explicit grant of license tokens from a centralized license server. For example, a network device for a licensed customer may locally manage a license token request for a capacity feature operating in network license mode and thus shared/contended for among multicast network devices associated with the customer. The network device may locally determine a number of locally-available tokens for the licensed capacity feature, based at least in some examples, on a number of available network-wide tokens as indicated by the license server, the number of network devices contending for the tokens, and a number of tokens already requested by the network device.

17 Claims, 4 Drawing Sheets

(56) References Cited

U.S. PATENT DOCUMENTS

2009/0092043 A1   4/2009  Lapuh et al.
2010/0293272 A1   11/2010 Karunakaren et al.

OTHER PUBLICATIONS

"Junos Pulse Secure Access Service—License Management Guide," Revision 7.4, Juniper Networks, Inc., Mar. 3, 2014, 44 pp.
U.S. Appl. No. 12/785,106, by Juniper Networks, Inc. (Inventors: Verma et al.), filed May 21, 2010.

* cited by examiner

ADAPTIVE CAPACITY MANAGEMENT FOR NETWORK LICENSING

TECHNICAL FIELD

The techniques described herein relate to computing networks and, more particularly, to managing licenses within computing networks.

BACKGROUND

A software or service license includes terms that grant a user limited rights to use a particular computer service or feature, based on the terms of the license agreement. For example, some software applications are provided under a licensing agreement that specifies the software application requires a license to use the service or feature. In another example, a user may be allowed to use the service or feature on a limited number of customer devices under the terms of the licensing agreement, but may not be allowed to use the service or feature on additional customer devices unless one of the previous licenses has been relinquished.

Licenses for computer-based services or features provide a useful tool that allows beneficial access to the licensed services or features, while still allowing the owner to maintain some control over how the services or features are used by individual users, by an enterprise, or by a business. For example, licenses allow the owners of licensed software to generate revenue according to various business models (e.g., price based on the number of users or customer devices, or price based on actual usage, etc.), and also to prevent unauthorized use or distribution of a service or feature.

Licensed services or features may be offered in a variety of ways, e.g., non-capacity and capacity. For example, a licensed non-capacity feature is a feature that is either enabled or disabled based on whether a customer or subscriber purchases the license to access the feature. A customer that purchases a non-capacity feature may access the feature using a license; otherwise, the feature is disabled by default. A licensed capacity feature is a feature in which the scaling or throughput of the feature is controlled. That is, the feature may be scaled for devices associated with the user based on a capacity value (e.g., bandwidth, number of users, number of instances of the feature, etc.) specified in a license for the user.

In some examples, a network license (commonly referred to as "floating license") to a capacity feature may provide access to a number of users and/or devices that share a capacity pool of license tokens (or, more simply, "tokens") available in a network for instances of the licensed capacity feature. The network license may be managed by a centralized license server that can be used to constrain the number of active instances of the feature at any given time to the number of tokens in the capacity pool for the network license. The centralized license server tracks the number of granted tokens and determines whether to grant or deny additional license token requests to access the feature based on the number of already-granted tokens and the total number of tokens in the capacity pool for the license.

SUMMARY

In general, the techniques are described for locally and adaptively managing license token requests for a licensed capacity feature without an explicit grant of license tokens from a centralized license server. For example, a network device for a licensed customer may locally manage a license token request for a capacity feature operating in network license mode and thus shared/contended for among multicast network devices associated with the customer. The network device may locally determine a number of locally-available tokens for the licensed capacity feature based, at least in some examples, on a number of available network-wide tokens as indicated by the license server, the number of network devices contending for the tokens, and a number of tokens already requested by the network device. If the network device determines that the number of locally-available tokens satisfies the number of tokens requested from an application, the network device may grant locally available tokens to the application responsive to the license token request and need not request additional tokens for the capacity feature from the license server. If the network device determines that the number of locally-available tokens does not satisfy the number of tokens requested from an application, the network device may request additional tokens from the license server for the capacity feature. The network device may also locally manage the release of tokens allocated to the network device by the license server for a licensed capacity feature.

By locally managing license token requests at least in part, the techniques may reduce latency for satisfying license token requests from applications executing on the network device. That is, the network device may determine that a request for additional tokens need not be made to the license server but instead may be satisfied locally, which reduces latency that would otherwise occur from requesting or releasing all license tokens from a remote license server. The techniques may also improve utilization of a licensed capacity service or feature by reducing, or in some cases eliminating, unused capacities that inhere to block-based license token request/grant models. Moreover, the techniques described herein provide simpler logic that is agnostic to licensing models. In this way, the techniques may simplify development of configuration logic to request and release license tokens.

In one example, a method includes receiving, by a network device and from an application executing on the network device, a license token request for one or more license tokens for a network license for a capacity feature provided by the network device, wherein the network license is shared among a plurality of network devices including the network device. The method may also include computing, by the network device, a threshold number of locally-available license tokens for the network license based at least on (1) a number of network-wide available license tokens for the network license, and (2) a number of the plurality of network devices. The method may also include sending, by the network device in response to determining that a number of license tokens requested by the application is not greater than the threshold number, a response to the application indicating that the network device can satisfy the license token request. The method may also include sending, by the network device to a license server for the network license and in response to determining that the number of license tokens requested by the application is greater than the threshold number, a request for one or more additional license tokens from the network-wide available license tokens for the network license.

In another example, a network device includes one or more processors operably coupled to a memory; and a local license manager configured for execution by the one or more processors to: receive, from an application executing on the network device, a license token request for one or more license tokens for a network license for a capacity feature provided by the network device, wherein the network license is shared among a plurality of network devices including the network device; compute a threshold number of locally-available license tokens for the network license based at least on (1) a number of network-wide available license tokens for the network license, and (2) a number of the plurality of network devices; send, to a license server for the network license and in response to determining that a number of license tokens requested by the application is not greater than the threshold number, a response to the application indicating that the network device can satisfy the license token request; and send, in response to determining that the number of license tokens requested by the application is greater than the threshold number, a request for one or more additional license tokens from the network-wide available license tokens for the network license.

In another example, a computer-readable medium includes instructions for causing one or more programmable processors of a network device to: receive a license token request from an application for one or more license tokens for a network license for a capacity feature provided by the network device, wherein the network license is shared among a plurality of network devices including the network device; compute a threshold number of locally-available license tokens for the network license based at least on (1) a number of network-wide available license tokens for the network license, and (2) a number of the plurality of network devices; send, to a license server for the network license and in response to determining that a number of license tokens requested by the application is not greater than the threshold number, a response to the application indicating that the network device can satisfy the license token request; and send, in response to determining that the number of license tokens requested by the application is greater than the threshold number, a request for one or more additional license tokens from the network-wide available license tokens for the network license.

The details of one or more examples are set forth in the accompanying drawings and the description below. Other features, objects, and advantages will be apparent from the description and drawings, and from the claims.

BRIEF DESCRIPTION OF DRAWINGS

Like reference symbols in the various drawings indicate like elements.

DETAILED DESCRIPTION

Figure 1:
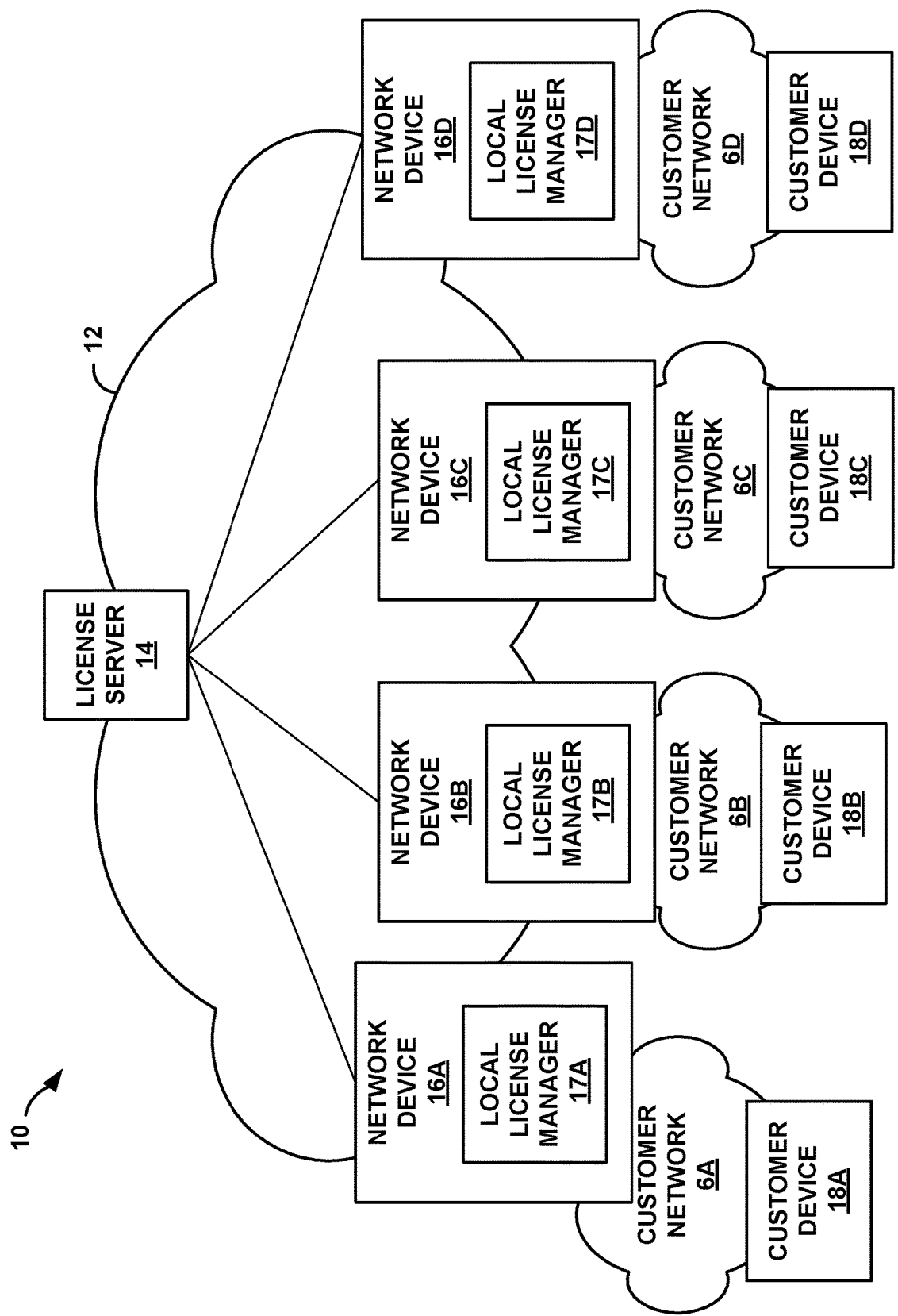
FIG. 1 is a block diagram illustrating an example network system in which a network device may locally manage license token requests, in accordance with the techniques described in this disclosure.

FIG. 1 is a block diagram illustrating an example network system 10 in which a network device may locally manage license token requests, in accordance with the techniques described herein. In the example of FIG. 1, network system 10 may include a license server 14 and a plurality of network devices 16A-16D (collectively, "network devices 16"). The configuration of network system 10 illustrated in FIG. 1 is merely an example. For example, a network system 10 may include any number of network devices 16. Nonetheless, for ease of description, only network devices 16A-16D are illustrated in FIG. 1.

Each of network devices 16 represents any network device that routes or otherwise forwards traffic through network 12, such as a router, switch, or security device. In some examples, network devices 16 may include Secure Sockets Layer virtual private network (SSL VPN) appliances, Unified Access Control (UAC) appliances, or other types of networked computing devices, such as servers or the like. Network devices 16 may provide customer devices 18A-18D (collectively, "customer devices 18") of customer networks 6A-6D (collectively, "customer networks 6"), respectively, with access to licensed features or services via applications executed by network devices 16. Network devices 16 may be configured to provide per-user, per-seat, per-sessions or other types of appropriate licenses that may, for example, allow customer devices 18 to access features or services provided by network devices 16. In some examples, network devices 16 may be configured to provide other types of licenses to customer devices 18, such as licenses that allow access to a specific application, or that allow access to other types of licensed services.

Customer networks 6 may be local area networks (LANs), wide area networks (WANs), or other public networks that include a plurality of subscriber and/or customer devices, e.g., customer devices 18. In some examples, customer networks 6 may comprise distributed network sites of the same customer enterprise. In other examples, customer networks 6 may belong to different entities. Customer devices 18 within customer networks 6 may include personal computers, laptops, smart phones, workstations, personal digital assistants (PDAs), wireless devices, network-ready appliances, file servers, print servers or other devices capable of requesting and receiving data via network 12. While not shown in the example of FIG. 1, network system 10 may include additional service provider networks, customer networks and other types of networks, such as access networks, private networks, or any other type of network.

In some examples, network 12 may be a shared network in which network devices 16 may communicate with one another. For example, network 12 may represent one or more service provider networks owned and operated by a service provider. In this context, network 12 is typically a layer three (L3) packet-switched network that provides L3 connectivity between a public network, such as the Internet, and one or more customer networks 6. Often, this L3 connectivity provided by service provider network 12 is marketed as a data service or Internet service, and subscribers in customer networks 6 may purchase a license to access a feature or service. Network 12 may represent a L3 packet-switched network that provides data, voice, television and any other type of service for purchase by subscribers and subsequent consumption by the subscribers in customer networks 6.

Network devices 16 may provide features or services that are classified in various categories, e.g., non-capacity and capacity. A licensed non-capacity feature is a feature that is either enabled or disabled based on whether a customer or subscriber purchases the license to access the feature. Dynamic quality-of-service (dynamic-qos) is an example of a noncapacity feature. A customer that purchases this type of feature may access the feature using a license; otherwise, the feature is typically disabled by default. A licensed capacity feature is a feature in which the scaling or throughput of the feature is controlled. That is, the feature may be scaled based on a capacity value (e.g., bandwidth, number of users, etc.) specified in a license. The number of subscribers supportable by a Broadband Network Gateway (BNG) is an example of a capacity feature. The number of subscribers in that example is the "licensed capacity" of the device according to the license. Other examples of capacity features include interfaces, interface bandwidths, routes, VPN instances, port capacity, and CPUs.

Network devices 16 may operate in network license mode (commonly referred to as "floating licensing") such that a limited capacity pool of license tokens managed by license server 14 for a network license to a licensed capacity feature are shared among network devices 16. Each license token enables an instance of the feature for a network device 16. For a given network license, network devices 16 each have a license capacity that corresponds to the number of license tokens obtained for that particular device, or the number of license tokens that the particular network device is otherwise configured to provide. In one example instance, network system 10 may provide a licensed capacity feature associated with a network license, managed by license server 14, with a licensed capacity of 5,000 tokens shared among network devices 16.

License server 14 may be a centralized license server that allocates tokens for a network license, based on the licensed capacity, to one or more of network devices 16. License server 14 may store, e.g., license tokens or license keys, that enable access to licensed features or services of network devices 16. As noted above, a single license token or key may represent a verifiable license key or may simply represent an indication of a grant of the license by the license server 14 of a single instance of the licensed capacity feature. In this way, license server 14 constrains the number of active instances of the feature at any given time to the number of tokens in the capacity pool for the network license (plus a buffer capacity in some instances), where the number of the tokens in the capacity pool is determined by the capacity of the network license purchased. The license server 14 tracks the number of granted tokens to determine whether to grant or deny additional license token requests to access the feature based on the number of already-granted tokens and the total number of tokens in the capacity pool for the license. License server 14 may represent one or more computing devices, such as real and/or virtual servers, executing a license server application to manage one or more network licenses for customers. In some examples, license server 14 may be deployed within a cloud such that the license server application is executed by an external cloud hosted server.

When a user of one of customer devices 18 attempts to sign in to an application to establish a new session on network 12, a network device typically forwards a license request (or "license token request" or "license key request") to obtain one or more license tokens to enable a licensed capacity feature or service provided by the network device. When license server 14 receives the license token request, license server 14 verifies that the customer has been allocated the license tokens the customer is requesting. License server 14 then determines whether license server 14 has sufficient license tokens available before granting the license token request. However, the above traditional techniques for requesting license tokens causes delays in servicing. For example, each request for a license token that is sent to license server 14 results in latency for the network device seeking to enable a licensed capacity feature. To avoid this latency, network devices may request license tokens in batches. For example, a network device may request 50 license tokens at a time from license server 14. However, by requesting license tokens in batches, a network device may request more license tokens than needed, which may result in underutilization and/or misallocation of license tokens among the network devices that share the capacity pool for the network license, for not all license tokens allocated in a batch grant of multiple tokens will necessarily be used by the requestor.

In accordance with the techniques described herein, each of network devices 16 includes a corresponding one of local license managers 17A-17D (collectively, "local license managers 17") to locally respond to license token requests by determining whether the network device 16 has locally-available tokens to satisfy the license token requests without having received an explicit grant of additional license tokens from license server 14. For example, to determine whether network device 16A has locally-available tokens to satisfy a license token request, local license manager 17A of network device 16A may be configured to compare, for a network license for a capacity feature of network device 16A, the current number of tokens requested for network device 16A with a threshold number of locally-available tokens that is calculated based on one or more licensing parameters for the network license.

Local license manager 17A may determine the threshold number of locally-available tokens for the licensed capacity feature based, at least in some examples, on licensing parameters including a number of available network-wide tokens as indicated by the license server 14, the number of network devices that use the network license, and a number of tokens already requested by the network device. Based on these parameters, local license manager 17A may determine the threshold number of locally-available tokens that is a fair share, for network device 16A, of the number of remaining, available network-wide tokens and use this threshold number to determine whether local license manager 17A is able to satisfy the license token request from the application without requesting additional tokens from license server 14.

As further described below in FIG. 2, the one or more licensing parameters for network device 16A may include, for example: (1) the total number of tokens for the network license that are unallocated and thus currently available network-wide in license server 14; (2) the total number of tokens purchased by the customer; (3) the buffer capacity, which is a value defining, e.g., a percentage of tokens for which the license provider may support in addition to the number of purchased tokens; (4) the number of network devices 16 that use the network license; (5) the total number of tokens already requested by network device 16A; and (6) the number of tokens currently allocated by license server 14 to network device 16A (i.e., the number of tokens currently held by network device 16A). Again, while described with respect to network device 16A, the licensing parameters and operations are similar for the other network devices 16.

As noted above, local license manager 17A compares the current number of tokens requested by an application with a computed threshold number of locally-available license tokens based on the one or more licensing parameters described above. For example, if the current number of tokens requested by the application is less than the computed threshold number of locally-available license tokens, local license manager 17A may determine that the network device 16A currently has available a sufficient number of tokens to satisfy the license token request. That is, the local license manager 17A may determine that the network device 16A may satisfy the license token request without needing to issue a request for additional tokens from license server 14. If the number of tokens being requested by the application is not less than the computed threshold number of locally-available tokens, the network device may make a request for additional tokens from license server 14.

The number of locally-available tokens computed by local license manager 17A may be different than the number of tokens granted to (or "held by") network device 16A by license server 14. The number of tokens of a network license held by network device 16A is merely one of the licensing parameters for the network license for determining the number of locally-available tokens for network device 16A for the network license.

As one example, an application executing on network device 16A may make a request for one or more license tokens to enable or access a capacity service or feature provided by network device 16A. Local license manager 17A may compute a threshold number of 1,150 locally available license tokens based on one or more licensing parameters described above. If the application requests 50 license tokens, for example, local license manager 17A determines, based on the comparison of the number of tokens requested from an application and the computed threshold, that network device 16A currently has a sufficient number of locally available tokens to satisfy the license token request without needing to request additional tokens from license server 14. In contrast, if the application requests 1,200 license tokens, local license manager 17A determines based on the comparison described above that network device 16A cannot satisfy the license token request. In response, network device 16A may make a request for a number of additional tokens from license server 14 sufficient to satisfy the license token request.

Additionally, each of network devices 16 may locally manage the release of license tokens currently allocated for the network device. As further described below in FIG. 2, local license manager 17A determines whether to release allocated tokens based, at least in some examples, on (1) a number of license tokens already requested by a network device; (2) a number of license tokens currently allocated by license server 14 to the network device; and (3) a number of tokens released by an application. In some examples, local license manager 17A may determine, based on the above parameters, to release the number of tokens released by the application back to license server 14. In other examples, local license manager 17A may determine to release a lesser number of tokens than the number of tokens released by the application back to license server 14.

In this way, the request and release of tokens for a network license for a capacity feature is locally managed at a network device, at least in part. By managing license token requests locally at the network device, requests for additional tokens from license server 14 may be reduced with a concomitant reduction in latency for granting tokens responsive to local network device requests from applications. The network devices 16 may also improve utilization of a licensed capacity service or feature by reducing, or in some cases eliminating, unused capacities that inhere to block-based license token request/grant models. Moreover, the techniques described herein provide simpler logic that is agnostic to licensing models. In this way, the techniques may simplify development of configuration logic to request and release license tokens.

Figure 2:
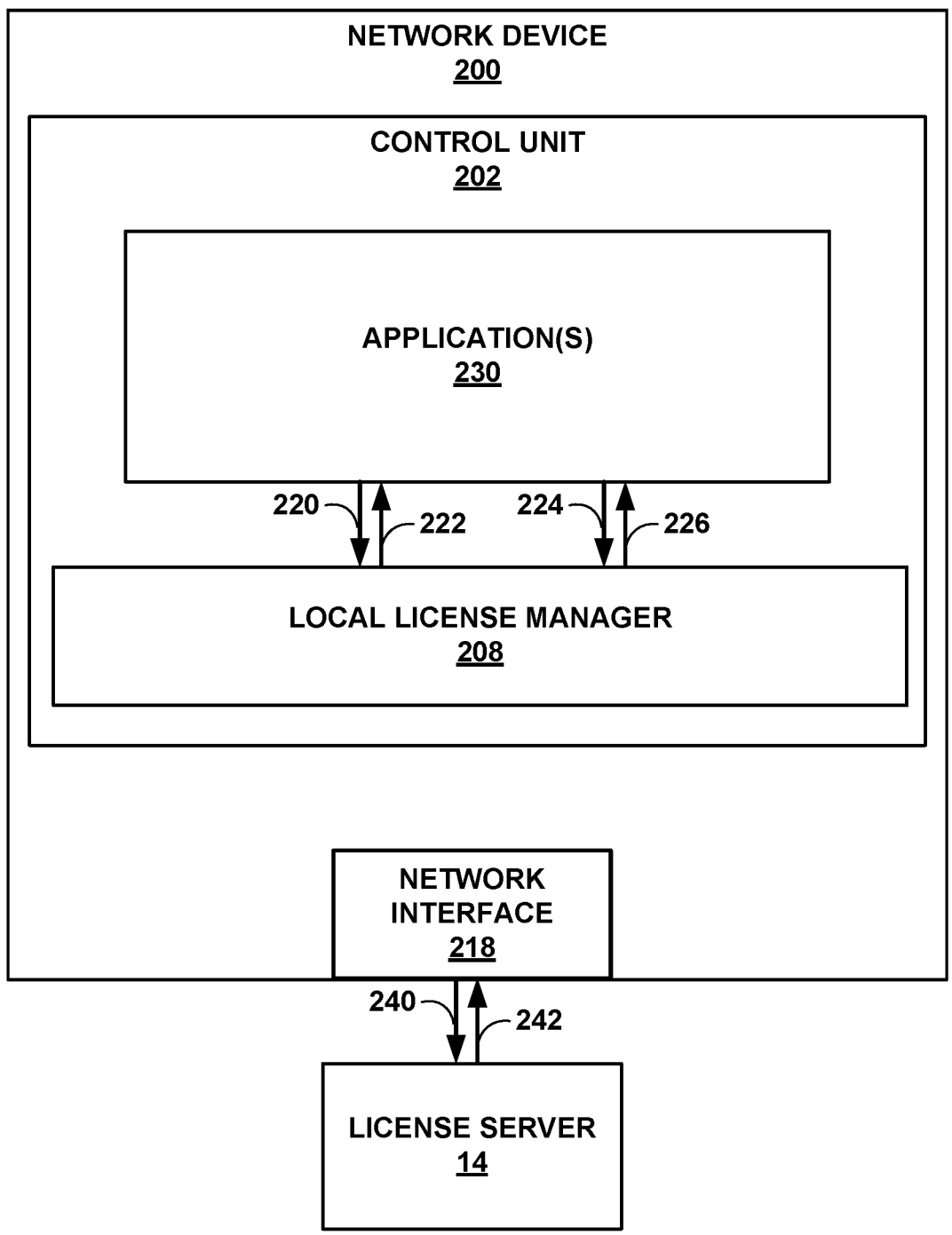
FIG. 2 is a block diagram illustrating an example network device for locally managing license token requests, in accordance with the techniques described herein.

FIG. 2 is a block diagram illustrating an example network device 200 for locally managing license token requests, in accordance with the techniques described herein. Network device 200 may operate as any of network devices 16 of FIG. 1. In the illustrated example of FIG. 2, network device 200 may include a control unit 202 with a local license manager 208 that provides control plane functionality for network device 200. For example, local license manager 208 may comprise one or more user-level processes that run licensing management software. Local license manager 208 may configure network device 200 as a client to license server 14, establish communication between network device 200 and license server 14, and manage license token requests, among other functions. In other implementations, network device 200 may include different, fewer, or additional modules for performing the techniques described herein.

Control unit 202 represents any combination of hardware, software, and/or firmware for implementing the functionality attributed to control unit 202 and its constituent modules and elements. When control unit 202 includes software or firmware, control unit 202 further includes any necessary hardware for storing and executing the software or firmware, such as one or more processors or processing units that include processing circuitry for executing instructions. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

Network device 200 may include one or more applications 230, such as a subscriber management daemon for managing subscribers and subscriber sessions for the network device, a chassis management daemon for managing the network device hardware, a routing process to execute routing protocols and generate forwarding information, or the like. To access the features or services provided by network device 200 via applications 230, any of applications 230 may each request one or more license tokens from local license manager 208.

In accordance with the techniques described herein, local license manager 208 locally manages licenses for a remote license server 14 to determine whether network device 200 has sufficient locally-available tokens to satisfy license token requests from applications 230. In the example of FIG. 2, local license manger 208 locally manages license token request 220 from one of applications 230 and provides a response 222 to the license token request 220 to the requesting one of applications 230. For example, network device 200 may manage user access to features or services of network device 200 on a licensed per-session or per-user basis. Local license manager 208 may determine whether network device 200 has locally-available tokens to satisfy the license token request 220 from applications 230 without having received an explicit grant of additional license tokens from license server 14.

In operation, a user may request to access a feature or service provided by network device 200, e.g., by logging into applications 230 via a user interface (not shown). To enable access to the features or services of network device 200, local license manager 208 may receive a license token request 220 from one or more applications 230. In response to receiving license token request 220, local license manager 208 may calculate a threshold number of locally-available tokens to determine whether network device 200 may satisfy license token request 220 without having to request and receive an explicit grant of additional license tokens from license server 14.

Local license manager 208 may apply the following formula to determine a number of locally-available tokens:

$$r < \frac{A + (N*p)}{c} - (n-t) \quad (1)$$

Local license manager 208 may use formula (1) to determine whether network device 200 has sufficient locally-available license tokens to satisfy license token request 220 from applications 230. As one example, to locally manage license token request 220, local license manager 208 may apply the following algorithm:
If $$r < \frac{A + (N*p)}{c} - (n-t)$$

then $n_{updated} = n + r$ return success else sync_with_server=true return not-enough-tokens The above algorithm compares the number of license tokens being requested by an application ("r") with a threshold number of locally-available tokens computed using the specified licensing parameters, as described below.

As one example, the one or more licensing parameters may include: (1) the total number of license tokens for the network license that are unallocated and thus currently available network-wide in license server 14 ("A"); (2) the total number of tokens purchased by the customer ("N"); (3) the buffer capacity, which is a value defining, e.g., a percentage of N for which the license provider may support in addition to the number of purchased tokens ("p"); (4) the number of network devices that use the network license ("C"); (5) the total number of tokens already requested by network device 200 ("n"); and (6) the number of tokens currently allocated by license server 14 to network device 200 ("t"). Based on the licensing parameters described above, local license manager 208 may compute a threshold for which network device 200 may satisfy (or not satisfy) license request 220 from applications 230. A network license with p=20% may support 1,200 tokens for a license where 1,000 tokens have been purchased by the customer.

As one example, license server 14 may have 5,000 license tokens, which is the total number of tokens purchased by the customer (N). License server 14 may currently have 4,000 tokens for the network license that are unallocated and available network-wide (A). Using the example in FIG. 1, the number of network devices that use the network license (C) is 4. Local license manager 208 may communicate with license server 14, e.g., over Secure Sockets Layer (SSL), or using a Transmission Control Protocol (TCP) session, by receiving messages or communications from license server 14 that include the values for N, A, and C. Local license manager 208 may request the values for N, A, and C. In some examples, local license manager 208 may receive the values for N, A, and C from an administrator.

The capacity buffer, p, may have a value of 20%, which may be any value configured by a vendor to define a buffer capacity for the network license. Network device 200 may have already requested 600 license tokens from license server 14 (n). Network device 200 may already hold 500 tokens that were allocated from license server 14 (t). Based on these licensing parameter values, when applied to formula (1), the computed threshold number for locally-available tokens is 1,150. That is, network device 200 has a threshold of 1,150 license tokens in a given interval that are available for use.

Local license manager 208 may compare the computed threshold number of locally available tokens with the current number of license tokens requested by the application ("r") to determine whether network device 200 has locally-available tokens to satisfy license token request 220 without having received an explicit grant of additional license tokens from license server 14. For example, if the application is currently requesting 50 tokens, local license manager 208 may determine that the number of locally-available tokens in network device 200 may satisfy license token request 220. That is, since the current number of license tokens requested by the application is less than the computed threshold of 1,150, network device 200 need not make a request for additional license tokens from license server 14.

In response, local license manager 208 may generate and send a response 222 to applications 230 to inform the applications 230 of the grant of the requested tokens. Local license manager 208 may also update the value for the total number of tokens already requested by network device 200 ("$n_{updated}$=n+r") for the next calculation of a threshold number of locally available tokens for a subsequent license token request.

If the current number of tokens requested by the application is 1,200, local license manager 208 may determine that the number of locally-available tokens of network device 200 cannot satisfy license token request 220. In response, local license manager 208 may initiate a synchronization with license server 14 ("sync_with_server=true") to make a request for additional license tokens. Local license manager 208 may then communicate with license server 14, e.g., over SSL, by sending messages or communications that include one or more requests 240 for additional license tokens from license server 14, and may receive messages or communications that include one or more responses 242, such as a response indicating whether license server 14 granted or denied the request 240.

In some examples in which the current number of license tokens requested by the application is not less than the calculated threshold, local license manager 208 may send a request for one or more additional license tokens from license server 14. License server 14 may track the number of granted tokens and determine whether to grant or deny request 240 based on the number of already-granted tokens and the total number of tokens in the capacity pool for the license. If license server 14 determines that it may grant additional license tokens for request 240, license server 14 may return a response 242 indicating that license server 14 grants the request. In response, local license manager 208 may send a response 222 to applications 230 indicating that the license token request 220 is successful, and local license manager 208 may send a response to the requesting application 230 to grant the license tokens to the application 230. If license server 14 determines that it may not grant additional license tokens for request 240, license server 14 may return a response 242 indicating that license server 14 denies the request. In response, local license manager 208 may send a response 222 to applications 230 indicating not enough license tokens are available to satisfy license token request 220 ("return not-enough-tokens").

Additionally, network device 200 may locally manage the release of license tokens allocated for the network device. As one example, local license manager 208 may apply the following algorithm:

If $(n>t)$

If $(s<(n-t))$ $n_{updated}=n-S$ else release $(s-(n-t))$ to server $n_{updated}=n-S$ else release s to server Local license manager 208 may use the above algorithm to locally control whether network device 200 releases one or more license tokens back to license server 14. For example, local license manager 208 may receive a message 224 indicating the number of license tokens released by applications 230. Local license manager 208 may compute a release threshold number based on one or more licensing parameters, to determine whether to release one or more license tokens back to license server 14. For example, the one or more licensing parameters may include: (1) the number of license tokens already requested by network device 200 ("n"); (2) the number of license tokens currently allocated by license server 14 to network device 200 ("t"); and (3) the number of license tokens released by applications 230 ("s").

In one instance, if local license manager 208 determines that the total number of license tokens already requested by network device 200 is greater than the number of license tokens currently allocated by license server 14 to network device 200 ("n>t"), and if the number of license tokens released by applications 230 is less than the difference between the total number of license tokens already requested by network device 200 and the number of license tokens currently allocated by license server 14 to network device 200 ("s<n−t"), the total number of license tokens already requested by network device 200 is updated by subtracting the number of license tokens released by applications 230 from the current total number of license tokens already requested by network device 200 ("$n_{updated}$=n−s"). That is, license manager 208 may not release tokens back to license server 14 if network device 200 has existing requests for tokens that exceed the number of tokens released by the application. In other words, network device 200 may retain license tokens to satisfy the current number of requested tokens.

If local license manager 208 determines that the total number of license tokens already requested by network device 200 is greater than the number of license tokens currently allocated by license server 14 to network device 200 ("n>t") and if the number of license tokens released by applications 230 is not less than the difference between the total number of license tokens already requested by network device 200 and the number of license tokens currently allocated by license server 14 to network device 200 ("not s<(n−t)"), the total number of license tokens already requested by network device 200 is updated by subtracting the number of license tokens released by applications 230 from the current total number of license tokens already requested by network device 200 ("$n_{updated}$=n−s") and the number of license tokens released to license server 14 is based on the number of license tokens released by applications 230 less the difference between the total number of license tokens already requested by network device 200 and the number of license tokens currently allocated by license server 14 to network device 200 ("s−(n−t)"). That is, license manager 208 may release tokens back to license server 14 if network device 200 need not retain license tokens to satisfy the current number of requested tokens.

If local license manager 208 determines that the total number of license tokens already requested by network device 200 is not greater than the number of license tokens currently allocated by license server 14 to network device 200 ("not n>t"), the number of license tokens released by applications 230 ("s") is released to license server 14. That is, network device 200 may release the full amount of license tokens released by applications 230 back to license server 14.

As one example, network device 200 may have already requested 600 license tokens (n) and already hold 500 license tokens (t). If the number of license tokens released by application 230 is 50, local license manager 208 may reduce the number of already requested license tokens by 50. If the number of license tokens released by application 230 is 200, local license manager 208 may instruct network device 200 to release 100 license tokens back to license server 14.

Figure 3:
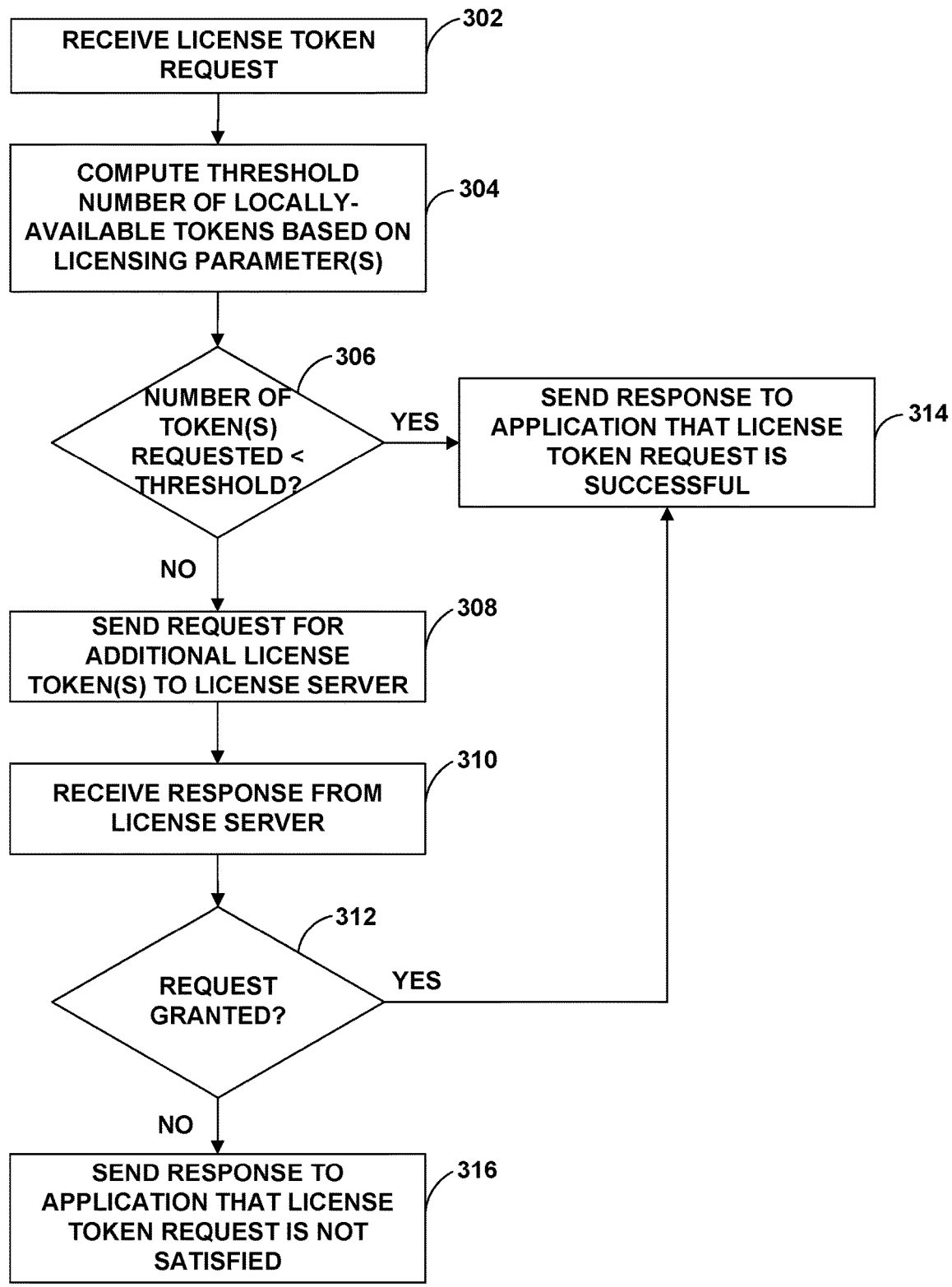
FIG. 3 is an example flowchart illustrating an example operation for locally managing license token requests at a network device, in accordance with the techniques described in this disclosure.

FIG. 3 is an example flowchart illustrating an example operation for locally managing license requests at a network device, in accordance with the techniques described in this disclosure. The example operation may be used by any of network devices 16A-16D of FIG. 1 or network device 200 of FIG. 2, to determine whether the network device may locally satisfy an incoming license request.

In the example of FIG. 3, local license manager 208 of network device 200 may receive a license token request from one or more applications 230 to access a feature or service provided by the network device (302).

Licensing module 208 may determine whether network device 200 may locally satisfy the license token request with locally-available tokens. For example, licensing module 208 of network device 200 may compute a threshold number of locally-available tokens based on one or more licensing parameters (304). As described above, network device 200 may learn of various licensing parameters, including: (1) the total number of license tokens currently available network-wide in license server 14 ("A"); (2) the total number of license tokens purchased by the customer ("N"); (3) the buffer capacity, which is a value defining, e.g., a percentage of licenses the license provider may support in addition to the number of purchased licenses ("p"); (4) the number of network devices that use the network license ("c"); (5) the total number of license tokens already requested by network device 200 ("n"); and (6) the number of license tokens currently allocated by license server 14 to network device 200 ("t").

Based on the licensing parameters described above, local license manager 208 of network device 200 may compare the number of license tokens requested by application 230 with the computed threshold number of locally-available tokens to determine whether network device 200 may satisfy the license token request without an explicit grant of license tokens from license server 14 (306). For example, if local license manager 208 determines that the current number of license tokens requested by application 230 is not less than the computed threshold (NO branch of 306), network device 200 may send a request for one or more additional license tokens from license server 14 (308). For example, local license manager 208 may synchronize with license server 14 to make a request for additional license tokens from license server 14. Local license manager 208 may receive from license server 14 a response indicating whether license server 14 grants or denies the request for additional license tokens (310). Local license manager 208 may determine, based on the response, whether local license manager 208 grants the request for additional license tokens (312). If local license manager 208 receives a response from license server 14 indicating that license server 14 grants the license token request (YES branch of 312), local license manager 208 may send a response to application 230 indicating that the license token request was successful and send a response to the requesting application 230 to grant the license tokens to the application 230 (314). If local license manager 208 receives a response from license server 14 indicating that license server 14 denies the license token request (NO branch of 312), local license manager 208 may send a response to application 230 indicating that the license token request is unsuccessful ("return not-enough-tokens") (316).

If local license manager 208 determines that the current number of license tokens requested by application 230 is less than the computed threshold (YES branch of 306), local license manager 208 may send a response to application 230 that indicates network device 200 may locally satisfy the license token request (314). That is, since the current number of license tokens requested by the application is less than the computed threshold, network device 200 need not make a request for additional license tokens from license server 14. Instead, local license manager 208 may update the value for the total number of license tokens already requested by network device 200 for the next license request.

Figure 4:
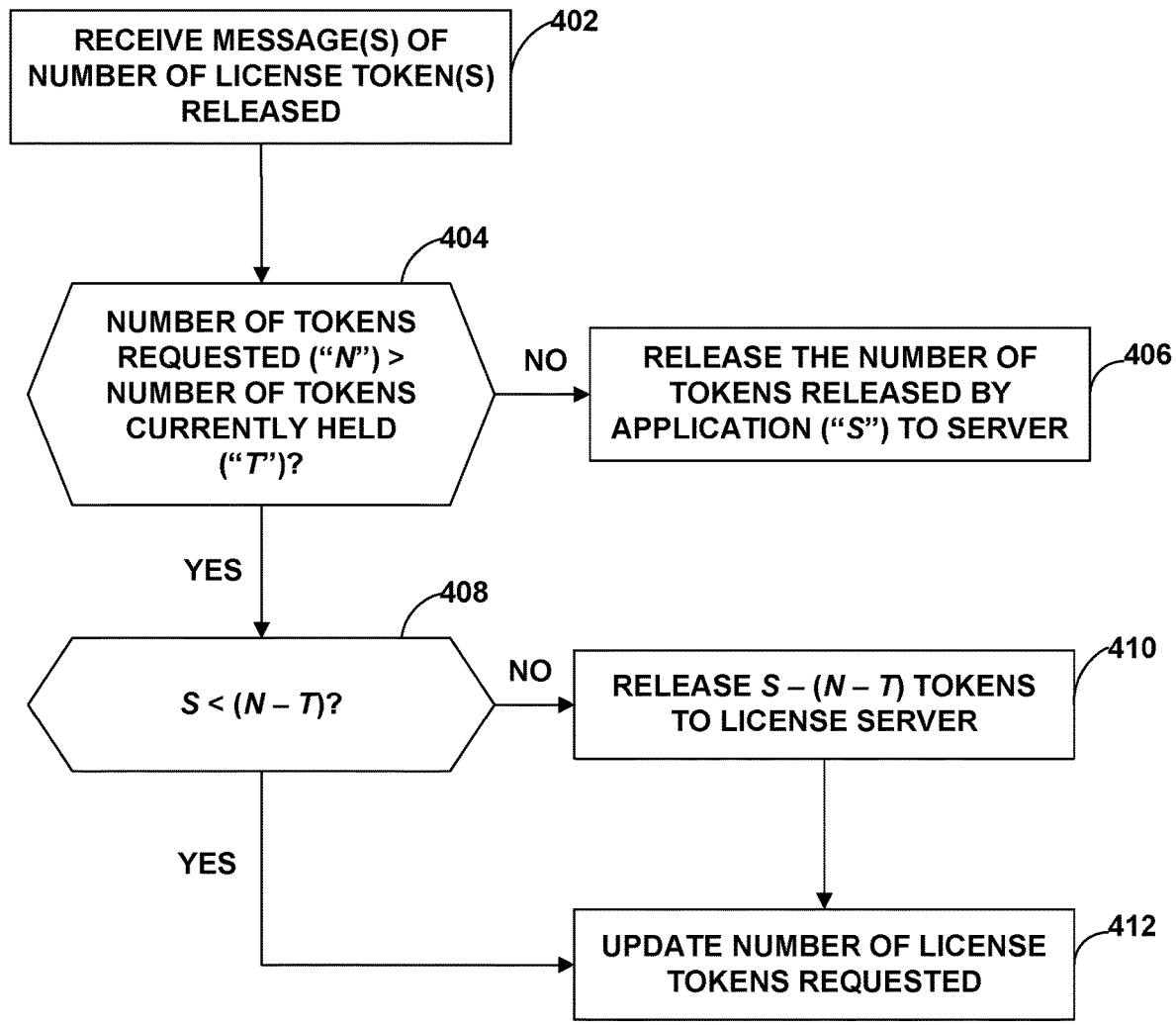
FIG. 4 is an example flowchart illustrating an example operation for locally managing the release of license tokens at a network device, in accordance with the techniques described in this disclosure.

FIG. 4 is an example flowchart illustrating an example operation for locally managing the release of license tokens at a network device, in accordance with the techniques described in this disclosure. The example operation may be used by any of network devices 16A-16D of FIG. 1 or network device 200 of FIG. 2, to determine whether the network device may release one or more license tokens back to license server 14.

In the example of FIG. 4, local license manager 208 may receive one or more messages indicating the number of one or more license tokens released from application 230 (402). Local license manager 208 may determine whether network device 200 may release license tokens back to license server 14. For example, local license manager 208 of network device 200 may compute a release threshold based on one or more licensing parameters. As described above, local license manager 208 may obtain various licensing parameters, including: the total number of license tokens already requested by network device 200 ("n"); the number of license tokens currently allocated by license server 14 to network device 200 ("t"), and the number of license tokens released by the application ("s").

Based on the licensing parameters described above, local license manager 208 of network device 200 may compare the number of license tokens requested by application 230 with the number of license tokens currently allocated by license server 14 to network device 200 to determine whether to release one or more license tokens back to license server 14 (404). For example, if the total number of license tokens already requested by network device 200 is not greater than the number of license tokens currently allocated by license server 14 to network device 200 ("not (n>t)") (NO branch of 406), network device 200 may release license tokens equal to the number of license tokens released by the application ("s") (406).

If the total number of license tokens already requested by network device 200 is greater than the number of license tokens currently allocated by license server 14 to network device (200) ("n>t") (YES branch of 406), local license manager 208 may then determine whether the number of license tokens released by the application is less than the difference between the total number of license tokens already requested by network device 200 and the number of license tokens currently allocated by license server 14 to network device 200 ("s<n−t") (408). If the number of license tokens released by the application is not less than the difference between the total number of license tokens already requested by network device 200 and the number of license tokens currently allocated by license server 14 to network device 200 ("not (s<(n−t))") (NO branch of 408), network device 200 may release license tokens equal to the number of license tokens released by the application less the difference between the total number of license tokens already requested by network device 200 and the number of license tokens currently allocated by license server 14 to network device 200 ("s−(n−t)") (410). Network device 200 may also update the value for the number of license tokens requested by subtracting the number of license tokens released by the application from the current number of license tokens currently allocated by license server 14 to network device 200 ("$n_{updated}$=n−s") (412).

If the number of license tokens released by the application is less than the difference between the total number of license tokens already requested by network device 200 and the number of license tokens currently allocated by license server 14 to network device 200 ("s<n−t") (YES branch of 408), local license manager 208 may update the value for the number of license tokens requested by subtracting the number of license tokens released by the application from the current number of license tokens currently allocated by license server 14 to network device 200 ("$n_{updated}$=n−s") (412).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

What is claimed is:

1. A method comprising:
receiving, by a particular network device of a plurality of network devices and from an application executing on the particular network device, a license token request for one or more license tokens for a network license for a capacity feature provided by the particular network device, wherein the network license is shared among the plurality of network devices;
computing, by the particular network device, a threshold number of locally-available license tokens in the particular network device for the network license based at least on a number of network-wide available license tokens for the network license, and a number of network devices in the plurality of network devices that use the network license;
determining, by the particular network device, whether the number of network-wide available license tokens requested by the application is greater than or is not greater than the threshold number of locally-available license tokens;
in response to determining that the number of network-wide available license tokens requested by the application is not greater than the threshold number of locally-available license tokens, granting, by the particular network device, the license token request from the locally-available license tokens and sending, by the particular network device, a response to the application indicating that the particular network device has granted the license token request from the locally-available license tokens; and
in response to determining that the number of network-wide available license tokens requested by the application is greater than the threshold number of locally-available license tokens, sending, by the particular network device, a request to a centralized license server to grant one or more additional license tokens from the network-wide available license tokens for the network license and receiving the grant of the one or more additional license tokens.

2. The method of claim 1, wherein computing the threshold number of locally-available license tokens for the network license is further based at least on a number of license tokens already requested by the particular network device.

3. The method of claim 1, wherein computing the threshold number of locally-available license tokens for the network license is further based at least on a number of license tokens already requested by the particular network device, and a number of license tokens currently allocated by the centralized license server to the particular network device.

4. The method of claim 1, wherein determining whether the number of license tokens requested by the application is greater than or is not greater than the threshold number of locally-available license tokens comprises determining whether the number of license tokens requested by the application is greater than or is not greater than the threshold number of locally-available license tokens, according to:

$$r < \frac{A + (N * p)}{c} - (n - t),$$

where r is a current number of license tokens requested by the application,
A is the number of network-wide available license tokens for the network license,
N is a number of license tokens purchased by a customer of the network license,
p is a buffer capacity for the number of license tokens purchased by the customer,
c is the number of network devices in the plurality of network devices that use the network license,
n is a number of license tokens already requested by the particular network device, and
t is a number of license tokens currently allocated by the centralized license server to the particular network device.

5. The method of claim 1, wherein computing the threshold number of locally-available license tokens for the network license comprises computing the threshold number of locally-available license tokens for the network license according to:

$$\frac{A + (N * p)}{c} - (n - t),$$

where A is the number of network-wide available license tokens for the network license,
N is a number of license tokens purchased by a customer of the network license,
p is a buffer capacity for the number of license tokens purchased by the customer,
c is the number of network devices in the plurality of network devices that use the network license,
n is a number of license tokens already requested by the particular network device, and
t is a number of license tokens currently allocated by the centralized license server to the particular network device.

6. The method of claim 1, further comprising:
comparing, by the particular network device, a number of license tokens already requested by the particular network device and a number of license tokens allocated by the centralized license server to the particular network device, and releasing, by the particular network device and in response to determining that the number of license tokens already requested by the particular network device is not greater than the number of license tokens allocated by the centralized license server to the particular network device, a number of license tokens released by the application back to the centralized license server.

7. The method of claim 6, further comprising:
releasing, by the particular network device and in response to determining that the number of license tokens already requested by the particular network device is greater than the number of license tokens allocated by the centralized license server to the particular network device, and the number of license tokens released by the application is not less than the difference of the number of license tokens already requested by the particular network device and the number of license tokens allocated by the centralized license server to the particular network device, a number of license tokens to the centralized license server, wherein the number of license tokens released to the centralized license server is based on the number of license tokens released by the application less the difference of the number of license tokens already requested by the particular network device and the number of license tokens allocated by the centralized license server to the particular network device.

8. The method of claim 7, further comprising:
updating, by the particular network device, the number of license tokens already requested by the particular network device by subtracting the number of license tokens released by the application from the number of license tokens requested by the particular network device.

9. A particular network device of a plurality of network devices, the particular network device comprising:
one or more processors operably coupled to a memory; and
a local license manager configured for execution by the one or more processors to:
receive, from an application executing on the particular network device, a license token request for one or more license tokens for a network license for a capacity feature provided by the particular network device, wherein the network license is shared among the plurality of network devices;
compute a threshold number of locally-available license tokens in the particular network device for the network license based at least on a number of network-wide available license tokens for the network license, and a number of network devices in the plurality of network devices that use the network license;
determine whether the number of network-wide available license tokens requested by the application is greater than or is not greater than the threshold number of locally-available license tokens;
in response to determining that the number of network-wide available license tokens requested by the application is not greater than the threshold number of locally-available license tokens, grant the license token request from the locally-available license tokens and send a response to the application indicating that the particular network device has granted the license token request from the locally-available license tokens; and
in response to determining that the number of network-wide available license tokens requested by the application is greater than the threshold number of locally-available license tokens, send a request to a centralized license server to grant one or more additional license tokens from the network-wide available license tokens for the network license and receive the grant of the one or more additional license tokens.

10. The particular network device of claim 9, wherein the threshold number of locally-available license tokens for the network license is further based at least on a number of license tokens already requested by the particular network device.

11. The particular network device of claim 9, wherein the threshold number of locally-available license tokens is further based at least on a number of license tokens already requested by the particular network device, and a number of license tokens allocated by the license server to the particular network device.

12. The particular network device of claim 9, wherein, to determine whether the number of license tokens requested by the application is greater than or is not greater than the threshold number of locally-available license tokens, the one or more processors are further configured to apply:

$$r < \frac{A + (N * p)}{c} - (n - t),$$

where r is a current number of license tokens requested by the application,
A is the number of network-wide available license tokens for the network license,
N is a number of license tokens purchased by a customer of the network license,
p is a buffer capacity for the number of license tokens purchased by the customer,
c is the number of network devices in the plurality of network devices that use the network license,
n is a total number of license tokens already requested by the particular network device, and
t is a number of license tokens currently allocated by the centralized license server to the particular network device.

13. The particular network device of claim 9, wherein, to compute the threshold number of locally-available license tokens for the network license, the one or more processors are further configured to apply:

$$\frac{A + (N * p)}{c} - (n - t),$$

where A is the number of network-wide available license tokens for the network license,
N is a number of license tokens purchased by a customer of the network license,
p is a buffer capacity for the number of license tokens purchased by the customer,
c is the number of network devices in the plurality of network devices that use the network license,
n is a number of license tokens already requested by the particular network device, and
t is a number of license tokens currently allocated by the centralized license server to the particular network device.

14. The particular network device of claim 9, wherein the one or more processors are further configured to:

compare a number of license tokens already requested by the particular network device and a number of license tokens allocated by the centralized license server to the particular network device, and release, in response to determining that the number of license tokens already requested by the particular network device is not greater than the number of license tokens allocated by the centralized license server to the particular network device, a number of license tokens released by the application back to the centralized license server.

15. The particular network device of claim 14, wherein the one or more processors are further configured to:

release, in response to determining that the number of license tokens already requested by the particular network device is greater than the number of license tokens allocated by the centralized license server to the particular network device, and the number of license tokens released by the application is not less than the difference of the number of license tokens already requested by the particular network device and the number of license tokens allocated by the centralized license server to the network device, a number of license tokens to the centralized license server, wherein the number of license tokens released to the centralized license server is based on the number of license tokens released by the application less the difference of the number of license tokens already requested by the particular network device and the number of license tokens allocated by the centralized license server to the particular network device.

16. The particular network device of claim 15, wherein the one or more processors are further configured to:

update the number of license tokens already requested by the particular network device by subtracting the number of license tokens released by the application from the number of license tokens already requested by the particular network device.

17. A non-transitory computer-readable medium comprising instructions for causing one or more programmable processors of a particular network device of a plurality of network devices to:

receive a license token request from an application for one or more license tokens for a network license for a capacity feature provided by the particular network device, wherein the network license is shared among the plurality of network devices;

compute a threshold number of locally-available license tokens in the particular network device for the network license based at least on a number of network-wide available license tokens for the network license, and a number of network devices in the plurality of network devices that use the network license;

determine whether the number of network-wide available license tokens requested by the application is greater-than or is not greater than the threshold number of locally-available license tokens;

in response to determining that the number of network-wide available license tokens requested by the application is not greater than the threshold number of locally-available license tokens, grant the license token request from the locally-available license tokens and send a response to the application indicating that the particular network device has granted the license token request from the locally-available license tokens; and in response to determining that the number of license tokens requested by the application is greater than the threshold number of locally-available license tokens, send a request to a centralized license server to grant one or more additional license tokens from the network-wide available license tokens for the network license and receive the grant of the one or more additional license tokens.

\* \* \* \* \*